US008416716B2

(12) United States Patent
Do et al.

(10) Patent No.: US 8,416,716 B2
(45) Date of Patent: Apr. 9, 2013

(54) COMMUNICATION DEVICE AND METHOD USING COOPERATIVE TRANSMISSION AND NETWORK CODING TRANSMISSION SCHEME

(75) Inventors: Mi Sun Do, Suwon-si (KR); Rakesh Taori, Suwon-si (KR); Jung Min Park, Seoul (KR); Young Ju Hwang, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 494 days.

(21) Appl. No.: 12/264,282

(22) Filed: Nov. 4, 2008

(65) Prior Publication Data

US 2009/0252098 A1    Oct. 8, 2009

(30) Foreign Application Priority Data

Apr. 2, 2008  (KR) ........................ 10-2008-0030861

(51) Int. Cl.
*H04B 7/005* (2006.01)
*H04J 3/00* (2006.01)
(52) U.S. Cl. .......................... 370/278; 370/337; 370/347
(58) Field of Classification Search .................. 370/278, 370/321, 337, 347, 326, 345
See application file for complete search history.

(56) References Cited

U.S. PATENT DOCUMENTS

| 6,115,369 | A | 9/2000 | Oura et al. | |
|---|---|---|---|---|
| 2004/0266340 | A1* | 12/2004 | Ivanov et al. | 455/11.1 |
| 2008/0107062 | A1* | 5/2008 | Viorel et al. | 370/315 |
| 2008/0151809 | A1* | 6/2008 | Chindapol et al. | 370/315 |
| 2008/0165719 | A1* | 7/2008 | Visotsky | 370/315 |
| 2008/0188231 | A1* | 8/2008 | Zhu et al. | 455/450 |
| 2008/0279135 | A1* | 11/2008 | Periyalwar et al. | 370/315 |
| 2009/0053994 | A1* | 2/2009 | Senarath et al. | 455/11.1 |
| 2009/0067533 | A1* | 3/2009 | Yuan et al. | 375/267 |
| 2009/0201889 | A1* | 8/2009 | Sundaresan et al. | 370/336 |
| 2009/0203310 | A1* | 8/2009 | Lozano et al. | 455/15 |
| 2009/0227258 | A1* | 9/2009 | Youn et al. | 455/445 |
| 2009/0239542 | A1* | 9/2009 | Horiuchi et al. | 455/445 |
| 2011/0002244 | A1* | 1/2011 | Wolfgang et al. | 370/280 |
| 2011/0110284 | A1* | 5/2011 | Wu et al. | 370/312 |
| 2011/0110310 | A1* | 5/2011 | Cai | 370/328 |

FOREIGN PATENT DOCUMENTS

| KR | 1020050044219 A | 5/2005 |
|---|---|---|
| KR | 1020060042797 A | 5/2006 |
| KR | 1020070038658 A | 4/2007 |
| KR | 1020070099172 A | 10/2007 |

* cited by examiner

*Primary Examiner* — Andrew Lee
(74) *Attorney, Agent, or Firm* — NSIP Law

(57) ABSTRACT

A communication device and method using a cooperative transmission and network coding transmission scheme are provided. A mobile station (MS) includes a data receiving unit to receive network coding data transmitted from at least one relay station (RS) and downlink data transmitted from a base station (BS), and a data transmission unit to transmit uplink data to the BS and the at least one RS, wherein the BS transmits the downlink data to the at least one RS.

18 Claims, 7 Drawing Sheets

COMMUNICATION DEVICE AND METHOD USING COOPERATIVE TRANSMISSION AND NETWORK CODING TRANSMISSION SCHEME

CROSS-REFERENCE TO RELATED APPLICATION

This application claims the benefit under 35 U.S.C. §119 (a) of a Korean Patent Application No. 2008-0030861, filed on Apr. 2, 2008, in the Korean Intellectual Property Office, the disclosure of which is incorporated herein by reference in its entirety.

TECHNICAL FIELD

The following description relates to a wireless communication system, and more particularly, to a communication device and method using a cooperative transmission and network coding transmission scheme.

BACKGROUND

A number of technologies such as an orthogonal frequency division multiplexing (OFDM) scheme, a multiple input multiple output (MIMO) scheme, a smart antenna, and the like are being provided for a high data transmission rate in a communication system. However, where a high data transmission rate is needed where transmission power is limited, an error rate may increase and a communicable distance may decrease.

A number of researches are being conducted on a relay station to improve a data transmission rate. In particular, relay station-related technologies such as an amplify-and-forward scheme, decode-and-forward scheme, reconfiguration/real-location-and-forward scheme, and the like have been developed.

Where use of a relay station is applied, however, resources to transmit data through a relay station may be additionally required. In this case, although a data transmission rate may be improved using a relay station, other difficulties may arise due to resources to be assigned for a data transmission.

Accordingly, there is a need for a communication method that may efficiently use resources for a data transmission and improve a data transmission rate.

SUMMARY

In one general aspect, there is provided a communication device and method that performs a cooperative transmission through a relay station (RS) in a data communication, and combines gain due to direct transmission and gain due to cooperative transmission.

In another general aspect, there is provided an RS that transmits network coding data which is generated according to a network coding scheme to a base station (BS) and mobile station (MS).

In still another general aspect, there is provided a communication device and method that applies a network coding scheme to data transmission through a plurality of RSs.

In yet another general aspect, there is provided a communication device and method that implements a base station (BS), a receiving station (RS), and a mobile station (MS) to transmit data based on a cooperative transmission.

In yet another general aspect, a mobile station (MS) comprises a data receiving unit to receive network coding data transmitted from at least one replay station (RS) and downlink data transmitted from a base station (BS), and a data transmission unit to transmit uplink data to the BS and the at least one RS, wherein the BS transmits the downlink data to the at least one RS.

The at least one RS and the MS may be located in a cell coverage area of the BS.

The network coding data may be generated by coding and combining the downlink data and the uplink data according to a network coding scheme.

The data receiving unit may receive the downlink data from the BS for a first time slot, and the data transmission unit may transmit the uplink data to the BS for a second time slot different from the first time slot.

The BS may transmit the downlink data to the at least one RS for the first time slot.

The data receiving unit may receive the network coding data from the at least one RS for a third time slot different from the first time slot and the second time slot.

The MS may further comprise a data extraction unit to extract the downlink data from the network coding data using the uplink data.

The data receiving unit receives network coding data transmitted from at least one RS.

In yet another general aspect, a relay station (RS) comprises a data receiving unit to receive uplink data transmitted from a mobile station (MS) and downlink data transmitted from a base station (BS), a network coding unit to code the downlink data and the uplink data according to a network coding scheme and generate network coding data, and a data transmission unit to transmit the network coding data to the BS and the MS, wherein the MS receives the downlink data from the BS and transmits the uplink data to the BS.

The RS and MS may be located in a cell coverage area of the BS.

The data receiving unit may receive the downlink data from the BS for a first time slot, and the uplink data from the MS for a second time slot different from the first time slot, and the data transmission unit may transmit the network coding data to the BS and the MS for a third time slot different from the first time slot and the second time slot.

The MS may receive the downlink data from the BS for the first time slot and transmits the uplink data to the RS for the second time slot.

The BS may extract the uplink data from the network coding data using the downlink data, and the MS may extract the downlink data from the network coding data using the uplink data.

The RS may be any one of at least one RS configuring a multi-hop relay network, and the MS may be the other one of the at least one RS configuring the multi-hop relay network.

In yet another general aspect, a base station (BS) comprises a data transmission unit to transmit downlink data to a mobile station (MS) and at least one relay station (RS), and a data receiving unit to receive uplink data transmitted from the MS and network coding data transmitted from the at least one RS, wherein the MS transmits the uplink data to the at least one RS and receives the network coding data from the at least one RS.

The at least one RS and the MS may be located in a cell coverage area of the BS.

The network coding data may be generated by coding and combining the downlink data and the uplink data according to a network coding scheme.

The data transmission unit may transmit the downlink data to the at least one RS and the MS for a first time slot, and the data receiving unit may receive the uplink data from the MS for a second time slot different from the first time slot, and receive the network coding data from the at least one RS for a third time slot different from the first time slot and second time slot.

The at least one RS may receive the uplink data from the MS for the second time slot, and the MS may receive the network coding data from the at least one RS for the third time slot.

The BS may further comprise a data extraction unit to extract the uplink data from the network coding data using the downlink data.

Other features will become apparent to those skilled in the art from the following detailed description, which, taken in conjunction with the attached drawings, discloses exemplary embodiments of the invention

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness.

Figure 1:
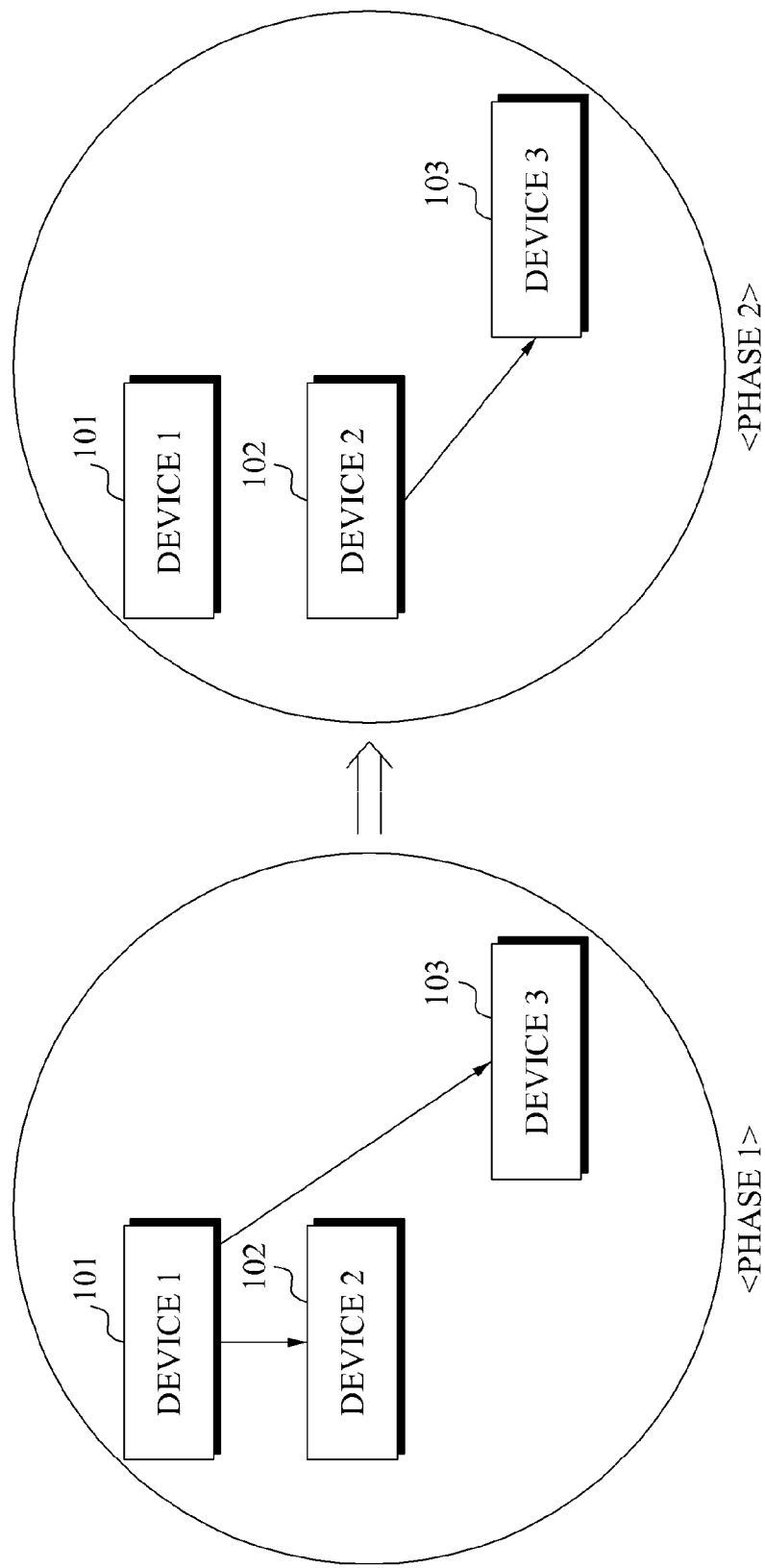
FIG. 1 is a diagram illustrating a cooperative transmission scheme through wireless communication devices according to an exemplary embodiment.

FIG. 1 illustrates a cooperative transmission scheme through wireless communication devices according to an exemplary embodiment.

As illustrated in FIG. 1, a wireless communication system comprises a device (1) 101, device (2) 102, and device (3) 103. Hereinafter, the device (1) 101, device (2) 102, and device (3) 103 are referred to as a communication device (1) 101, communication device (2) 102, and communication device (3) 103, respectively.

In a phase 1, the communication device (1) 101 may transmit data to the communication device (2) 102 and communication device (3) 103. In this case, the data transmitted to the communication device (2) 102 and the data transmitted to the communication device (3) 103 may be identical. The data transmitted to the communication device (2) 102 and communication device (3) 103 may be transformed due to a phase shift and/or a time shift. In this case, it is assumed that the communication device (2) 102 and communication device (3) 103 are included in a cell coverage of the communication device (1) 101.

In a phase 2, the communication device (2) 102 may receive the data from the communication device (1) 101 and transmit the data to the communication device (3) 103. Accordingly, the communication device (3) 103 may receive data where the data directly transmitted from the communication device (1) 101 and data, forwarded by the communication device (2) 102 and transmitted based on the cooperative transmission, are combined. Accordingly, gain due to the direct transmission and gain due to the cooperative transmission are combined, and thus a data transmission rate may be improved.

For example, where the communication device (3) 103 is located near a cell coverage boundary of the communication device (1) 101, data loss may increase while transmitting the data from the communication device (1) 101 to the communication device (3) 103. Where the same data is transmitted based on the cooperative transmission through the communication device (2) 102, less loss of data received by the communication device (3) 103 may be incurred. FIG. 1 illustrates a transmission operation of downlink data transmitted to the communication device (3) 103 from the communication device (1) 101.

Conversely, the communication device (3) 103 may directly transmit the data to the communication device (1) 101, and cooperatively transmit the data through the communication device (2) 102 using the same method described above. That is, a transmission operation of uplink data transmitted from the communication device (3) 103 to the communication device (1) 101 may be applied the same as the cooperative transmission operation illustrated in FIG. 1.

For example, the communication device (1) 101 may be a base station (BS). The communication device (2) 102 may be a relay station (RS). The communication device (3) 103 may be a mobile station (MS). Where the communication device (3) 103 is an RS, a multihop relay network may be embodied by extending wireless communication system illustrated in FIG. 1. In the multihop relay network, data is transmitted through a plurality of RSs.

According to an aspect, where the cooperative transmission through a relay station illustrated in FIG. 1 is applied, the gain due to the direct transmission and gain due to the cooperative transmission are combined. Accordingly, the data transmission rate may be improved. However, since a data transmission resource is to be assigned to the communication device (2) 102 functioning as the relay station, it may not be easy to efficiently use the limited resource.

Figure 2:
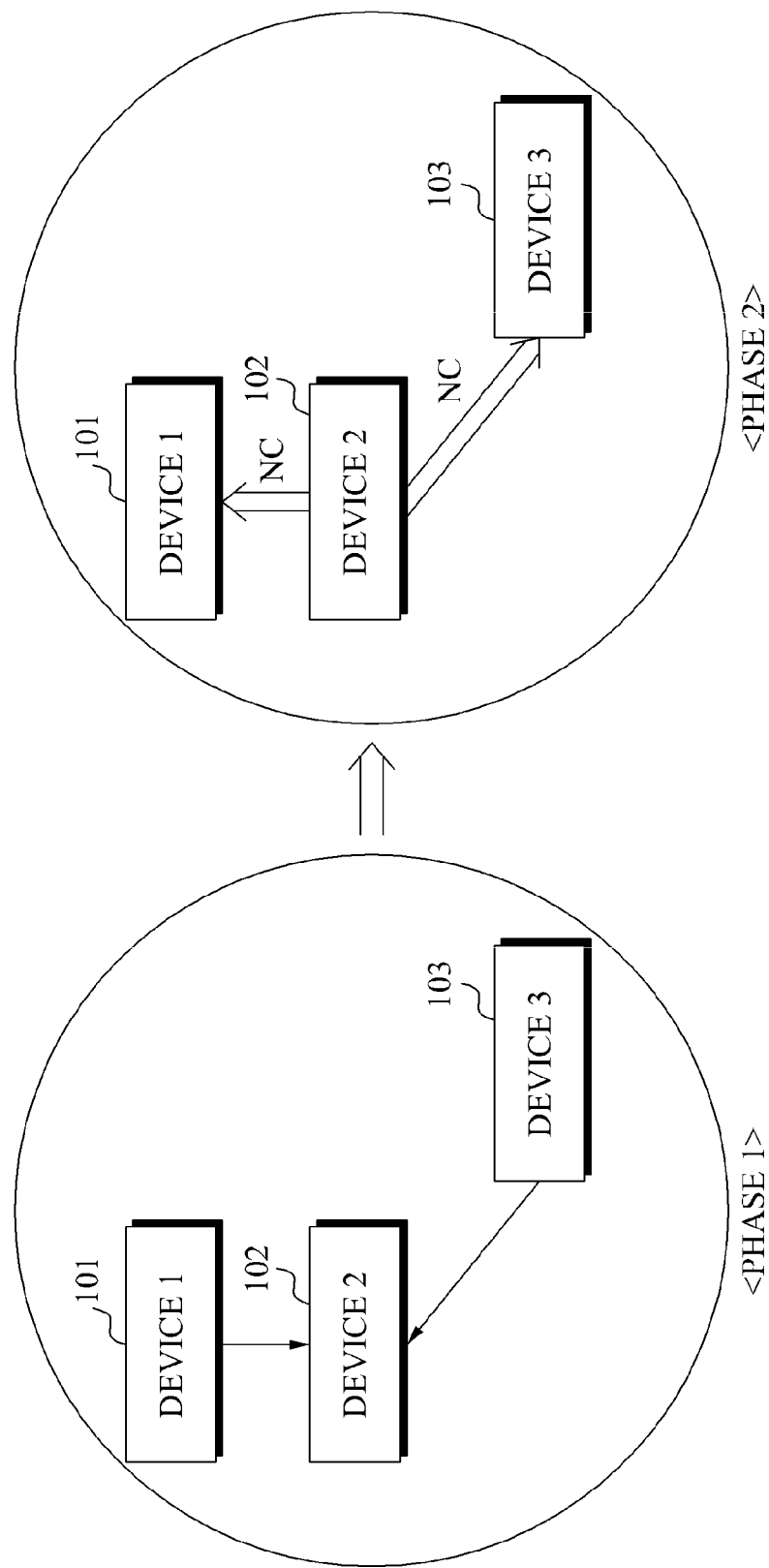
FIG. 2 is a diagram illustrating an operation of transmitting network coding data through wireless communication devices according to an exemplary embodiment.

FIG. 2 illustrates an operation of transmitting network coding (NC) data through wireless communication devices according to an exemplary embodiment.

As illustrated in FIG. 2, in a phase 1, each of a communication device (1) 101 and communication device (3) 103 may transmit data to a communication device (2) 102. In a phase 2, the communication device (2) 102 may code and combine the data received from each of the communication device (1) 101 and communication device (3) 103 according to a network coding scheme. Also, the communication device (2) 102 may transmit the combined NC to the communication device (1) 101 and communication device (3) 103.

For example, in the phase 1, each of the communication device (1) 101 and communication device (3) 103 may transmit data "a" and data "b" to the communication device (2) 102, respectively. Where the network coding scheme is applied, the communication device (2) 102 may perform a network coding and combine the data "a" received from the communication device (1) 101 and the data "b" received from the communication device (3) 103. For example, the network-coded data may be c=a XOR b. In this case, in the phase 2, the communication device (2) 102 may transmit NC "c" to each of the communication device (1) 101 and communication device (3) 103. In this case, the NC "c" may be transmitted to the communication device (1) 101 and communication device (3) 103. The NC "c" may be simultaneously transmitted to the communication device (1) 101 and communication device (3) 103.

Accordingly, the communication device (1) 101 may extract the data "b", transmitted by the communication device (3) 103, from the received NC "c". In a same way, the communication device (2) 102 may extract the data "a", transmitted by the communication device (1) 101, from the received NC "c".

That is, although the data "a", transmitted by the communication device (1) 101, is not transmitted to the communication device (3) 103 via the communication device (2) 102, the communication device (3) 103 may extract the data "a" from the NC "c". Also, although the data "b", transmitted by the communication device (3) 103, is not transmitted to the communication device (1) 101 via the communication device 2 102, the communication device (1) 101 may extract the data "b" from the NC "c". Where data is transmitted through NC scheme, time required for data transmission may be saved and limitedly assigned resource may be efficiently used.

For example, the communication device (1) 101 may be a base station (BS), the communication device (2) 102 may be a relay station (RS), and communication device (3) 103 may be a mobile station (MS). Where the communication device (3) 103 is an RS, a multihop relay network may be embodied by extending the wireless communication system illustrated in FIG. 1. In the multihop relay network, data is transmitted through a plurality of RSs.

According to an aspect, where the network coding transmission scheme of FIG. 2 is applied, time required for relay transmission may be reduced and limited wireless resource may be efficiently used. However, where the network coding scheme is used, direct transmission between the communication device (1) 101 and communication device (3) 103 may not be necessary, and thus gain due to a cooperative transmission may not be generated.

According to an aspect, the cooperative transmission scheme illustrated in FIG. 1 and network coding transmission scheme illustrated in FIG. 2 may be combined in a wireless communication system. Thus, in the wireless communication system, gain may be improved according to the cooperative transmission scheme through the RS, and thus a data transmission rate may increase. Also, limitedly assigned resource may be efficiently used according to the network coding transmission scheme.

Figure 3:
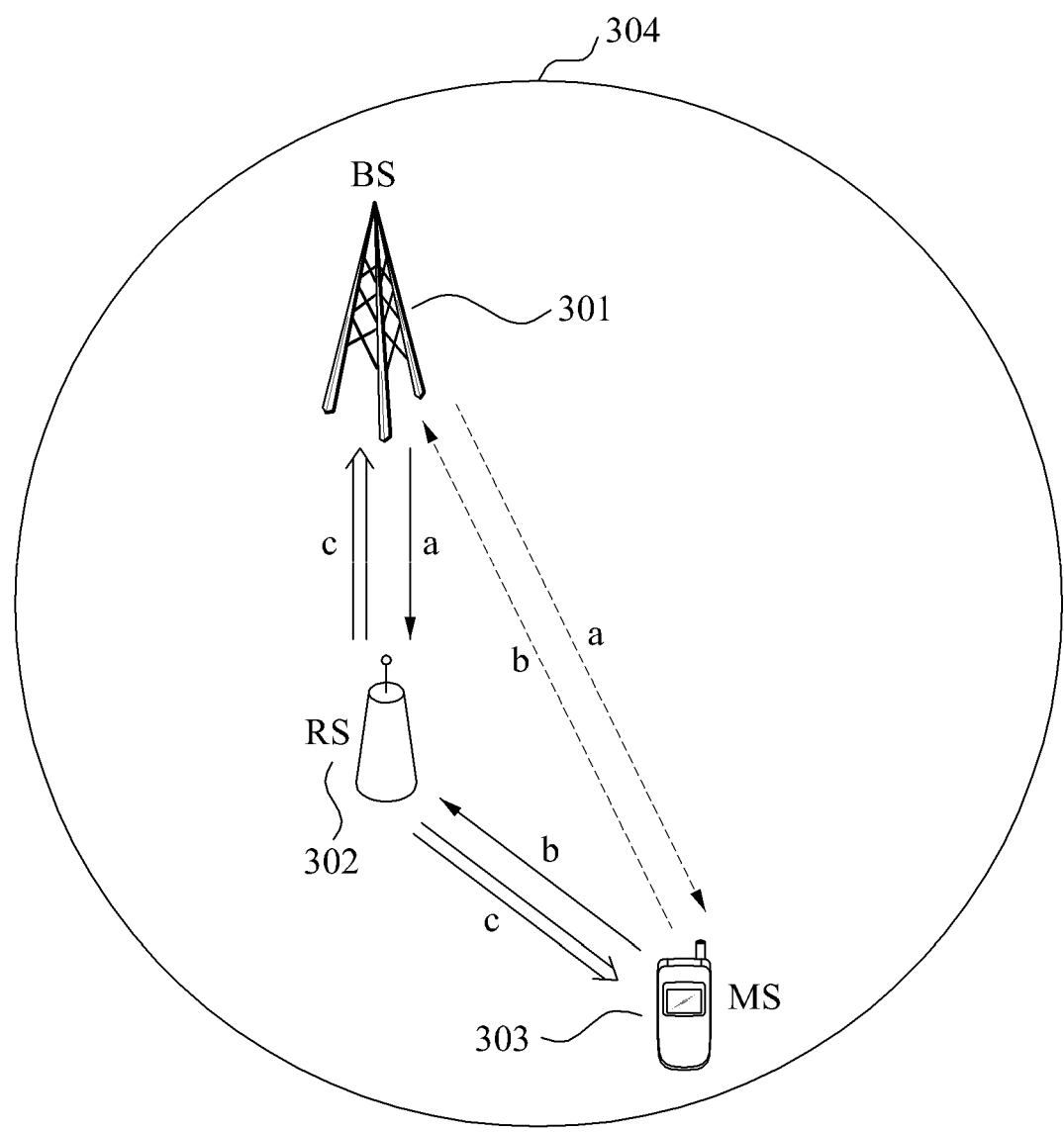
FIG. 3 is a configuration diagram illustrating a wireless communication system according to an exemplary embodiment.

FIG. 3 illustrates a wireless communication system comprising a BS, RS, and MS according to an exemplary embodiment.

As illustrated in FIG. 3, in the wireless communication system, a relay station (RS) 302 and a mobile station (MS) 303 may be located in a cell coverage 304 of a base station (BS) 301. That is, a cooperative transmission may be implemented through communication devices located in the cell coverage 304.

The BS 301 may transmit data "a" to the MS 303 and RS 302. The data "a" indicates downlink data. That is, the BS 301 may transmit the downlink data to the RS 302 and MS 303 for a downlink time slot.

Also, the MS 302 may transmit data "b" to the BS 301 and RS 302. The data "b" indicates uplink data. That is, the MS 303 may transmit the uplink data to the BS 301 and RS 302 for a uplink time slot.

For example, the RS 302 may generate NC "c". The NC "c" is generated by coding and combining the downlink data "a" with the uplink data "b" using a network coding scheme. The downlink data "a" is received from the BS 301, and uplink data "b" is received from the MS 303. After the downlink time slot and uplink time slot, the RS 302 may transmit the NC "c" to each of the BS 301 and MS 303. As an example, network coding data may be generated by combing uplink data and downlink data by using an XOR function, for example, c=a XOR b. The network coding scheme may not be limited and various schemes may be applied.

In this case, it may be assumed that the BS 301 and MS 303 previously have information that the downlink data "a" is associated with the uplink data "b" based on the NC "c". The BS 301 may extract the uplink data "b" from the NC "c" using the downlink data "a". Similarly, the MS 303 may extract the downlink data "a" from the NC "c" using the uplink data "b".

Accordingly, the BS 301 may transmit the downlink data "a" to the RS 302 and MS 303. Also, the RS 302 may transmit to the MS 303 the NC "c" generated by combining the downlink data "a" received from the BS 301 and uplink data "b" received from the MS 303. Also, the MS 303 may extract the downlink data "a" from the NC "c" using the uplink data "b".

That is, the MS 303 may directly receive the downlink data "a" from the BS 301, and indirectly receive the downlink data "a" from the RS 302 through the NC "c".

According to an aspect, data is transmitted by applying a network coding transmission according to a network coding scheme and a cooperative transmission through a relay transmission, and accordingly, gain due to the cooperative transmission may be improved and resources assigned for data transmission according to the network coding transmission may be saved.

Figure 4:
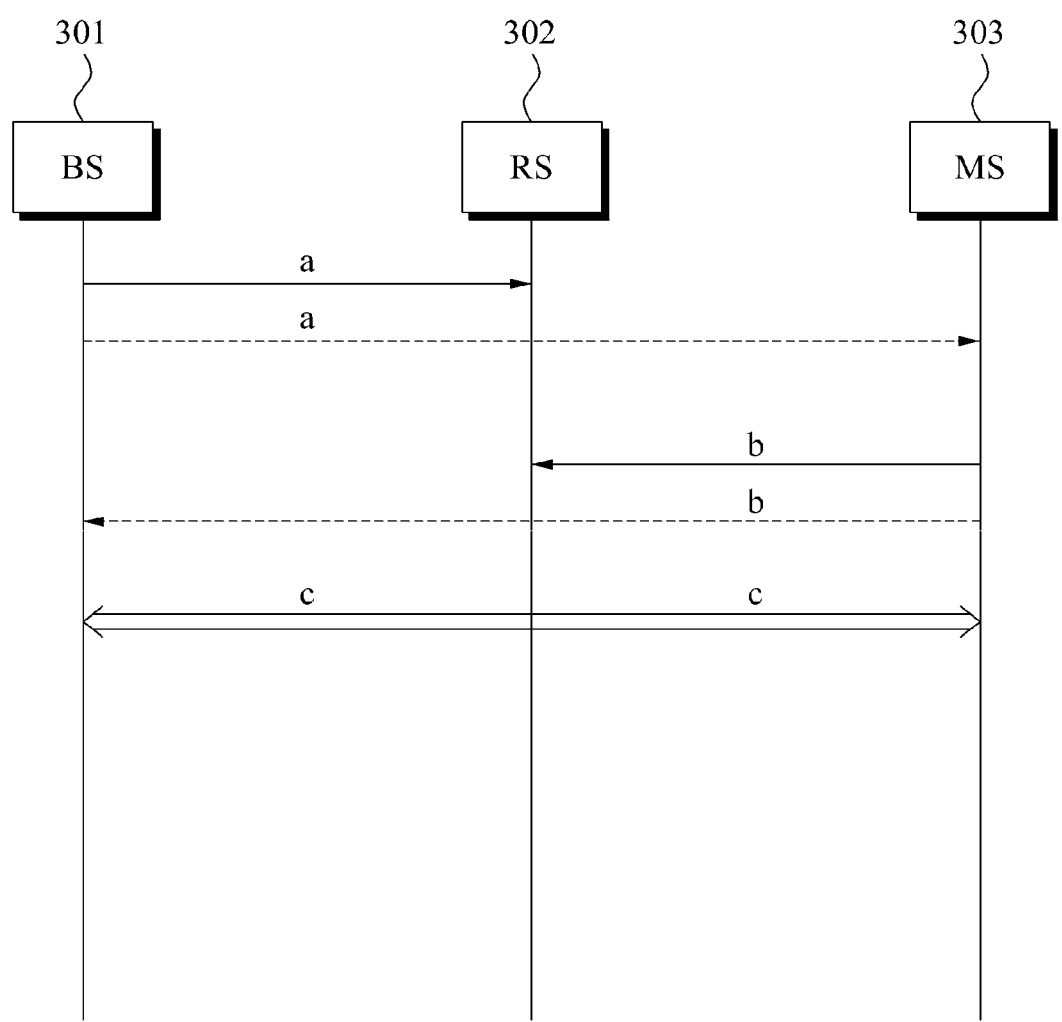
FIG. 4 is a diagram illustrating a data flow in a wireless communication system according to an exemplary embodiment.

FIG. 4 illustrates a data flow in a wireless communication system comprising a BS, RS, and MS according to an exemplary embodiment.

Referring to FIG. 4, a BS 301 may transmit data "a" to an RS 302. The BS 301 may transmit data "a" to an MS 303. The data "a" is downlink data. That is, the BS 301 may transmit the downlink data "a" to the RS 302 and MS 303 for a downlink time slot.

Also, referring to FIG. 4, the MS 303 may transmit data "b" to the RS 302. Also, the MS 303 may transmit the data "b" to the BS 301. The data "b" is uplink data. That is, the MS 303 may transmit the uplink data "b" to the RS 302 and BS 301 for an uplink time slot. In this case, the downlink time slot and uplink time slot may be differentiated. For example, the downlink time slot may occur earlier than the uplink time slot.

The RS 302 may generate NC "c". The NC "c" is generated by coding and combining the downlink data "a" received from the BS 301 and uplink data "b" received from the MS 303. The downlink data "a" may be associated with the uplink data "b" through a network coding. That is, where the downlink data "a" is known, the uplink data "b" may be extracted from the NC "c". Also, where the uplink data "b" is known, the downlink data "a" may be extracted from the NC "c".

The RS 302 may transmit the NC "c" to the BS 301 and MS 303 for a network coding time slot. The network coding time slot is different from the downlink time slot for transmitting the downlink data "a" and uplink time slot for transmitting the uplink data "b". The network coding time slot may occur after the downlink time slot and uplink time slot.

Then, the BS 301 may extract the uplink data "b" from the NC "c" using the downlink data "a". Accordingly, the BS 301 may directly receive the uplink data "b" from the MS 303 for the uplink time slot. Also, the BS 301 may extract the uplink data "b" through the NC "c" received via the RS 302 for the network coding time slot. Accordingly, the BS 301 may receive the uplink data "b" through a cooperative transmission of the RS 302 and MS 303.

In the same way, the MS 303 may extract the downlink data "a" from the NC "c" using the uplink data "b". Accordingly, the MS 303 may directly receive the downlink data "a" from the BS 301 for the downlink time slot. Also, the MS 303 may extract the downlink data "a" through the NC "c" received through the RS 302 for the network coding time slot. Accordingly, the MS 303 may receive the downlink data "a" through a cooperative transmission of the RS 302 and BS 301.

Referring to FIG. 4, it may be ascertained that any one of time where the RS 302 forwards the downlink data "a" received from the BS 301 and transmits the downlink data "a" to the MS 303 and time where the RS 302 forwards the uplink data "b" received from the MS 303 and transmits the uplink data "b" to the BS 301 may not required.

Figure 5:
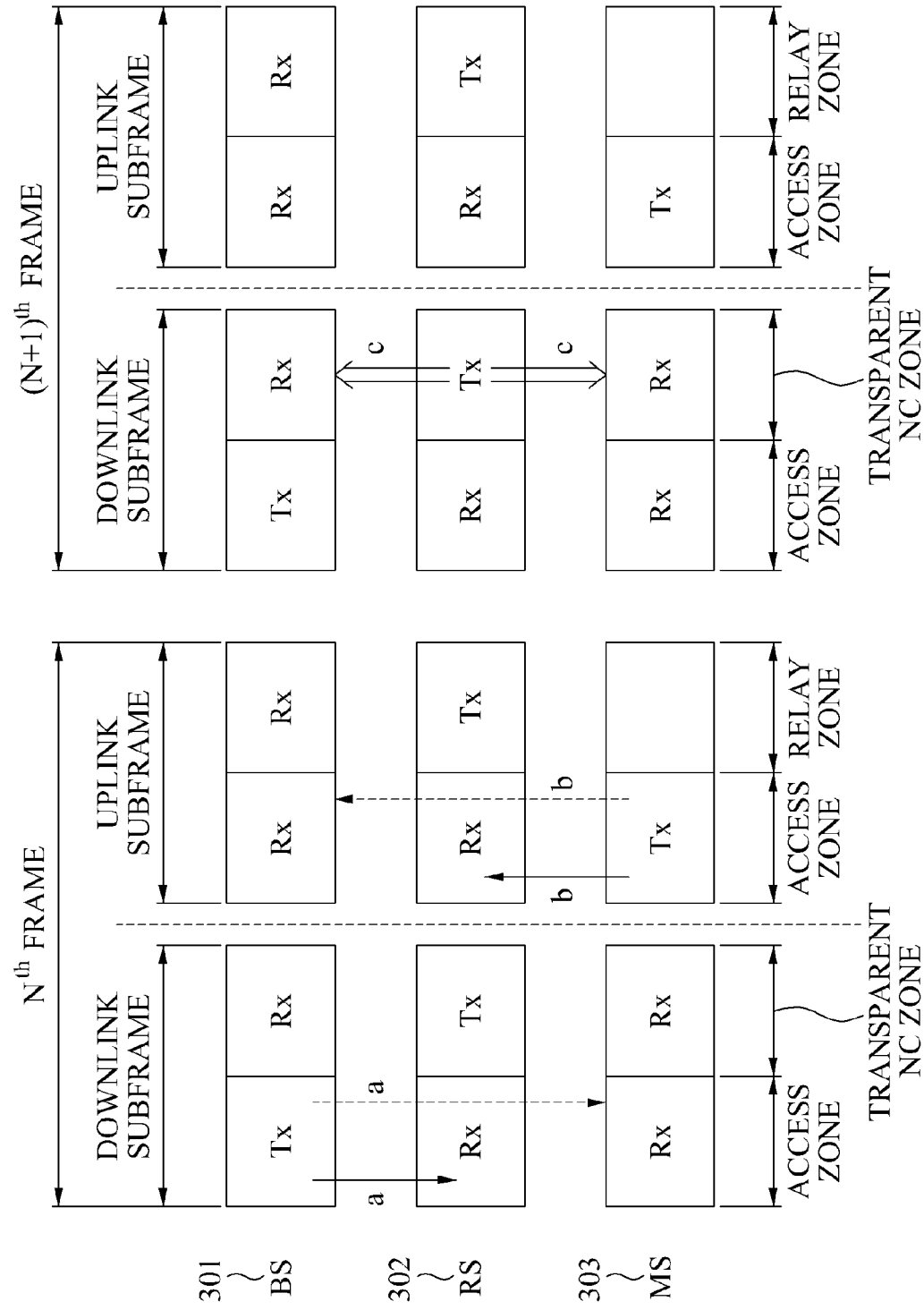
FIG. 5 is a diagram illustrating a data frame structure in a network in accordance to Institute of Electrical and Electronics Engineers (IEEE) 802.16.

FIG. 5 illustrates a data frame structure in a network in accordance to Institute of Electrical and Electronics Engineers (IEEE) 802.16.

FIG. 5 illustrates an example of a data configuration necessary for the network of IEEE 802.16, and illustrates an example where the data flow of FIG. 4 is visually segmented. The data configuration illustrated in FIG. 5 may be divided into an $N^{th}$ frame and $(N+1)^{th}$ frame.

Each of the $N^{th}$ frame and $(N+1)^{th}$ frame may be divided into a downlink subframe slot and uplink subframe period. A BS 301 is set as a transmission (Tx) mode for a downlink subframe period of the $N^{th}$ frame. The BS 301 may transmit downlink data "a" to an RS 302 and MS 303 in a receiving (Rx) mode.

The MS 303 is set as the Tx mode for a uplink subframe period of the $N^{th}$ frame. The MS 303 may transmit uplink data "b" to the BS 301 and RS 302 in the Rx mode.

The RS 302 is set as the Tx mode for a downlink subframe period of the $(N+1)^{th}$ frame. The RS 302 may transmit NC "c" to the BS 301 and MS 303 in the Rx mode.

The above-described operation may be repeatedly performed for an entire slot of the data frame. Also, the frame structure of FIG. 5 is described based on the $N^{th}$ frame. Where the frame structure of FIG. 5 is described based on an $(N-1)^{th}$ frame, the RS 302 is set as the Tx mode for the downlink subframe period of the $N^{th}$ frame. The RS 302 may transmit the NC "c" to the BS 301 and MS 303 in the Rx mode.

For reference, where a transparent NC zone is located in the uplink subframe period, the MS 303 is to be operated in the Rx mode for the uplink subframe period, which is against a backward compatibility of the MS 303. Accordingly, the transparent NC zone may be included in the downlink subframe to maintain the backward compatibility of the MS 303.

Figure 6:
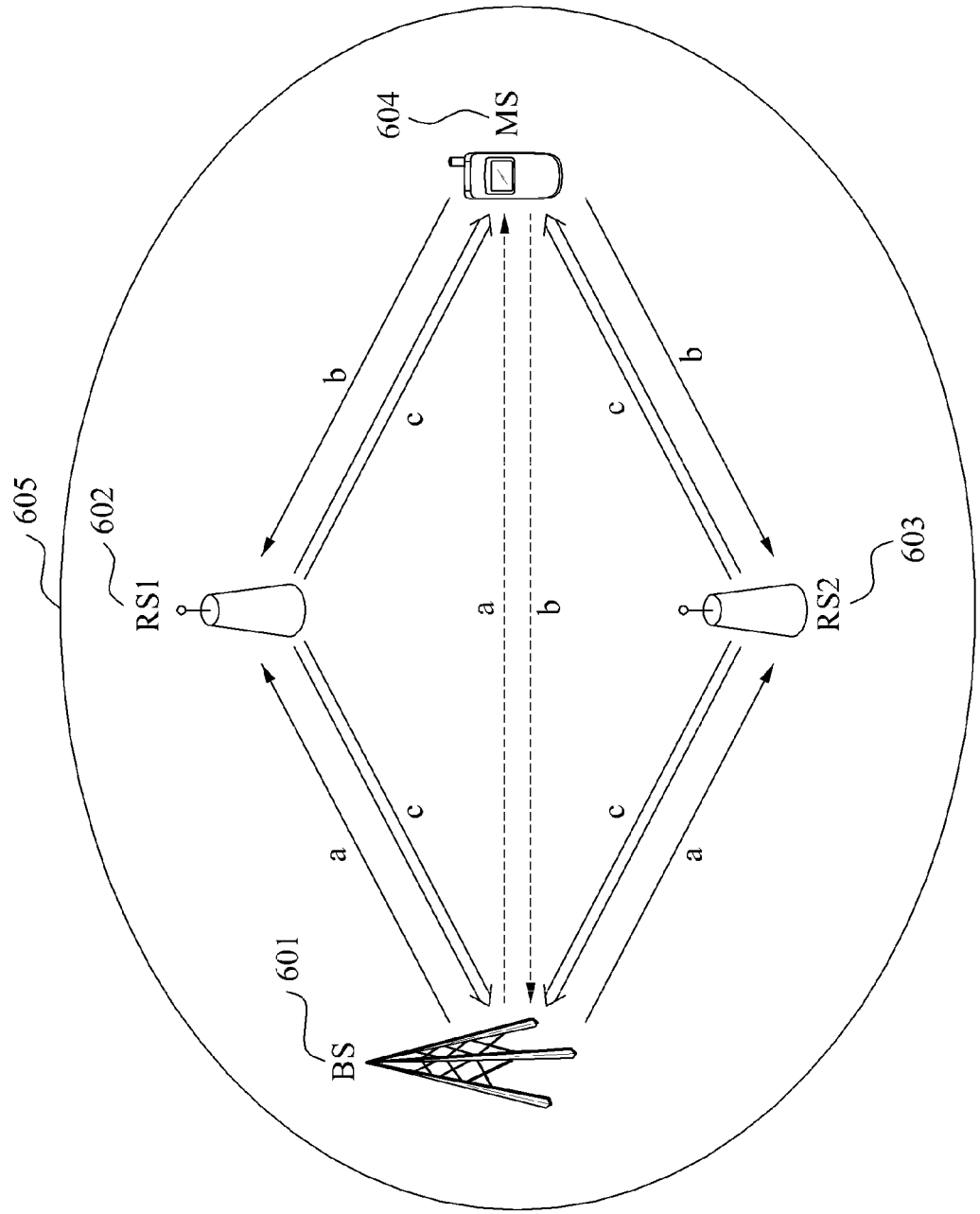
FIG. 6 is a diagram illustrating a data flow in a wireless communication system including multiple RSs according to an exemplary embodiment.

FIG. 6 illustrates a data flow in a wireless communication system comprising multiple RSs according to an exemplary embodiment.

As illustrated in FIG. 6, the wireless communication system may include a BS 601, RS1 602, RS2 603, and MS 604. Although it is illustrated that two RSs exist in FIG. 6, at least one RS may be included in the wireless communication system. That is, a number of RSs is not limited to the above-described embodiment. The RS1 602, RS2 603, and MS 604 may be located in a cell coverage 605 of the BS 601.

Referring to FIG. 6, the wireless communication system may be divided into a unit 1 and unit 2. The unit 1 includes the BS 601, RS1 602, and MS 604. The unit 2 includes the BS 601, RS2 603, and MS 604. That is, communication devices included in each unit may transmit data according to a transmission process described with reference to FIGS. 1 through 5.

In the unit 1, the BS 601 may transmit downlink data "a" to the RS1 602 and MS 604 for a downlink time slot. Also, the MS 604 may transmit uplink data "b" to the RS1 602 and BS 601 for an uplink time slot. After transmitting, the RS1 602 may generate NC "c" generated by coding and combining the received downlink data "a" and uplink data "b". The RS1 602 may transmit the NC "c" to the BS 601 and MS 604 for a network coding time slot. The transmission process described above may be identically applied to the unit 2.

The MS 604 may receive the downlink data, received directly from the BS 601, and extract downlink data from the NC received from the RS1 602 and RS2 603. Accordingly, the MS 604 may obtain transmission gain due to the RS1 602 and RS2 603. As the number of RSs increases, transmission gain due to an RS may increase. In this case, a network coding scheme in the RS1 602 and RS2 603 may be different.

However, although more resources to be assigned for data transmission may be needed depending on the number of RSs, limitedly assigned resources may be saved since the network coding scheme is applied.

Figure 7:
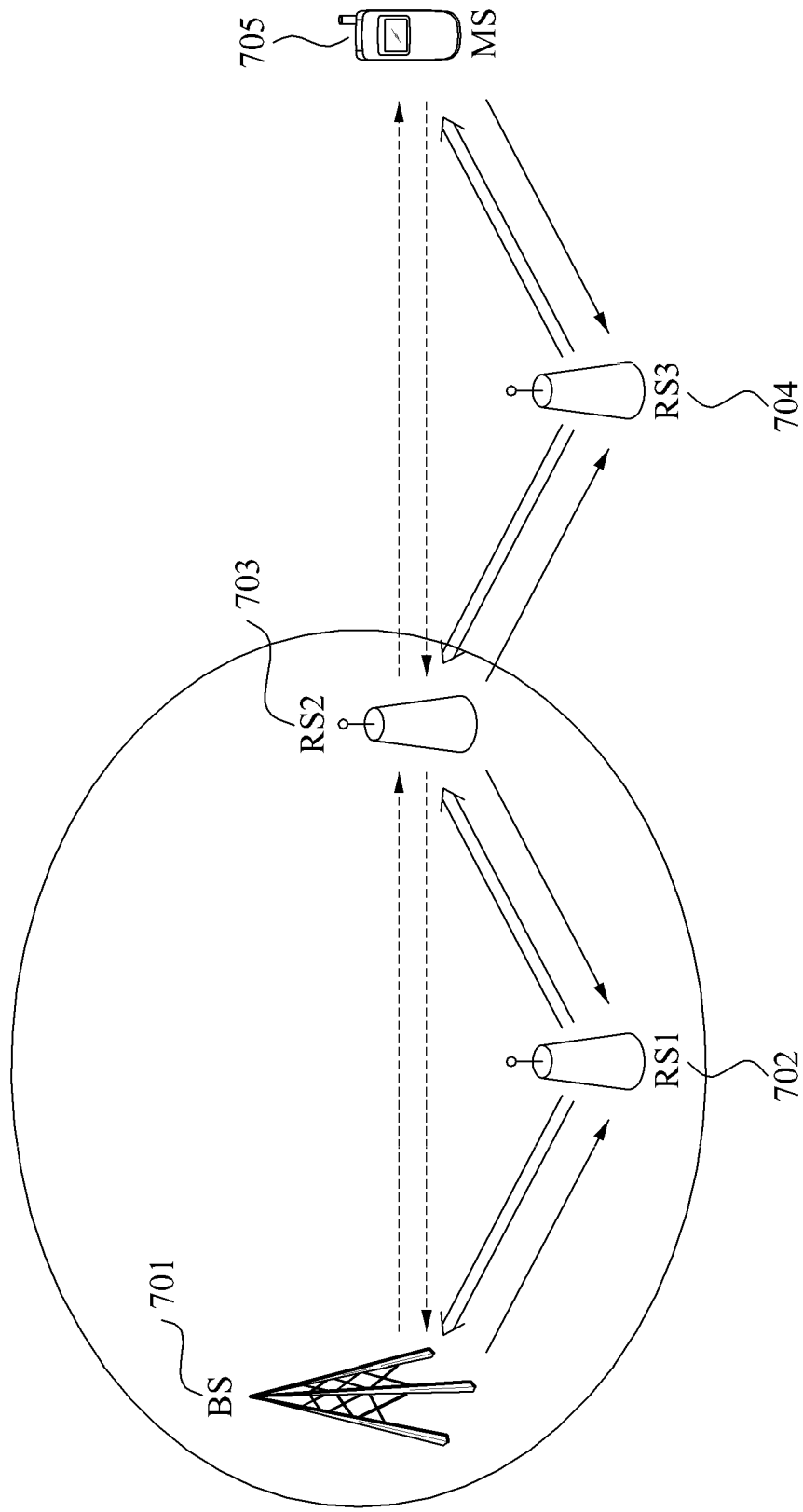
FIG. 7 is a diagram illustrating a data flow in a wireless communication system including a multihop RS according to an exemplary embodiment.

FIG. 7 illustrates a data flow in a wireless communication system comprising a multihop RS according to an exemplary embodiment.

As illustrated in FIG. 7, the wireless communication system may include a BS 701, RS1 702, RS2 703, RS3 704, and MS 705. Referring to FIG. 7, the wireless communication system may be divided into a unit 1 and unit 2. The unit 1 includes the BS 701, RS1 702, and RS2 703, and the unit 2 includes the RS2 703, RS3 704, and MS 705. Each communication device included in each of the unit 1 and unit 2 may transmit data according to a transmission process described in FIGS. 1 through 5.

Specifically, FIG. 7 illustrates an example where the multihop RS that serially connects a plurality of RSs and may improve a cell coverage of the BS 701, is applied to a wireless communication system according to an exemplary embodiment. As illustrated in FIG. 7, the RS1 702, RS2 703, and RS3 704 may function as an MS 303 of FIG. 3 and MS 604 of FIG. 6.

When described based on the unit 1, the BS 701 may transmit downlink data to the RS1 702 and RS2 703 for a downlink time slot. The RS2 703 may transmit uplink data to the RS1 702 and BS 701 for an uplink time slot. In this case, the uplink data may be data transmitted based on the cooperative transmission through the MS 705 and RS3 704.

After transmitting, the RS1 702 may generate NC by coding and combining the received downlink data and uplink data. The RS1 702 may transmit the generated NC to the BS 701 and RS2 703 for a network coding time slot. An operation described above may be identically applied to the unit 2.

The RS2 703 may receive the downlink data directly received from the BS 701 and extract downlink data from the NC, received through the RS1 702. The RS2 703 may transmit the received downlink data to the RS3 704 and MS 705 again, and thus the cell coverage of the BS 701 may be extended. The cell coverage of the BS 701 is a data transmission range of the BS 701.

According to certain embodiments described herein, data transmission gain may be increase due to, for example, a cooperative transmission using an RS, and a data transmission resource may be saved due to, for example, a network coding transmission.

Although not illustrated in FIGS. 1 through 7, an operation method of an MS according to an exemplary embodiment may include an operation of receiving NC transmitted from at least one RS and downlink data transmitted from a BS, and an operation of transmitting uplink data to the BS and at least one RS. In this case, in the operation method, the BS may transmit the downlink data to the at least one RS.

An operation method of an RS according to an exemplary embodiment may include an operation of receiving uplink data transmitted from an MS and downlink data transmitted from a BS, an operation of coding the downlink data and uplink data according to a network coding scheme and generating NC, and an operation of transmitting the NC to the BS and MS. In this case, the MS may receive the downlink data from the BS and transmit the uplink data to the BS.

An operation method of a BS according to an exemplary embodiment may include an operation of transmitting downlink data to an MS and at least one RS, and an operation of receiving uplink data transmitted from the MS and NC transmitted from the at least one RS. In this case, the MS may transmit the uplink data to the at least one RS and receive the NC from the at least one RS.

According to certain embodiments described above, data transmission rate may be improved, time required for an RS to transmit data to a BS and MS may be reduced, resources limitedly assigned may be more efficiently used, and/or a data throughput may be improved.

The above-described exemplary communication methods may be recorded, or fixed in one or more computer-readable media that includes program instructions to be implemented by a computer to case a processor to execute or perform the program instructions. The media may also include, independent or in combination with the program instructions, data files, data structures, and the like. The media and program instructions may be those specially designed and constructed for the purposes the example embodiment of the present invention, or they may be of the kind well-known and available to those having skill in the computer software arts. Examples of computer-readable media may include magnetic media such as hard disks, floppy disks, and magnetic tape, optical media, for example, CD ROM disks and DVD, magneto-optical media, for example, optical disks, and hardware devices that may be specially configured to store and perform program instructions, for example, read-only memory (ROM), random access memory (RAM), flash memory, and the like. Examples of program instructions include both machine code, for example, produced by a compiler, and files containing higher level code that may be executed by the computer using an interpreter. The described hardware devices may be configured to act as one or more software modules in order to perform the operations described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile station (MS), comprising:
a data receiving unit configured to receive network coding data transmitted from a relay station (RS) and downlink data transmitted from a base station (BS); and
a data transmission unit configured to transmit uplink data to the BS and the RS; and
a data extraction unit configured to extract the downlink data from the network coding data using the uplink data, wherein the network coding is generated by applying a logical operation to operands of the downlink data and uplink data.

2. The MS of claim 1, wherein the network coding data combines the downlink data and the uplink data according to a network coding scheme.

3. The MS of claim 1, wherein:
the data receiving unit receives the downlink data from the BS in a first time slot, and
the data transmission unit transmits the uplink data to the BS in a second time slot, which is different from the first time slot.

4. The MS of claim 3, wherein the data receiving unit receives the network coding data from the RS in a third time slot, which is different from the first time slot and the second time slot.

5. The mobile station of claim 1, wherein the data extraction unit applies a logical operation to the operands of the network coding data and the uplink data to extract the downlink data.

6. The mobile station of claim 5, wherein the logical operation is an exclusive-OR operation.

7. The mobile station of claim 1, wherein the network coding data contains no more data than the larger of the uplink data and downlink data.

8. A relay station (RS), comprising:
a data receiving unit configured to receive uplink data transmitted from a mobile station (MS) and downlink data transmitted from a base station (BS);
a network coding unit configured to code the downlink data and the uplink data, according to a network coding scheme, to generate network coding data;
a data transmission unit configured to transmit the network coding data to the BS and the MS, wherein
the network coding data is generated by applying a logical operation to operands of the downlink data and uplink data.

9. The RS of claim 8, wherein:
the data receiving unit receives the downlink data from the BS in a first time slot and the uplink data from the MS in a second time slot, which is different from the first time slot, and
the data transmission unit transmits the network coding data to the BS and the MS in a third time slot, which is different from the first time slot and the second time slot.

10. The relay station of claim 8, wherein the logical operation is an exclusive-OR operation.

11. The relay station of claim 8, wherein the network coding data contains no more data than the larger of the uplink data and downlink data.

12. The relay station of claim 8, wherein the network coding data is generated such that:
the uplink data cannot be derived from the network coding data without knowledge of the downlink data, and
the downlink data cannot be derived from the network coding data without knowledge of the uplink data.

13. A base station (BS), comprising:
a data transmission unit configured to transmit downlink data to a mobile station (MS) and a relay station (RS);
a data receiving unit configured to receive uplink data transmitted from the MS and network coding data transmitted from the RS; and
a data extraction unit configured to extract the uplink data from the network coding data using the downlink data, wherein the network coding is generated by applying a logical operation to operands of the downlink data and uplink data.

14. The BS of claim 13, wherein the network coding data combines the downlink data and the uplink data according to a network coding scheme.

15. The BS of claim 13, wherein:
the data transmission unit transmits the downlink data to the RS and the MS in a first time slot, the data receiving unit receives the uplink data from the MS in a second time slot, which is different from the first time slot, and receives the network coding data from the RS in a third time slot, which is different from the first time slot and the second time slot.

16. The base station of claim 13, wherein the data extraction unit applies a logical operation to the operands of the network coding data and the downlink data to extract the uplink data.

17. The base station of claim 16, wherein the logical operation is an exclusive-OR operation.

18. The base station of claim 13, wherein the network coding data contains no more data than the larger of the uplink data and downlink data.

* * * * *